Figure 1:
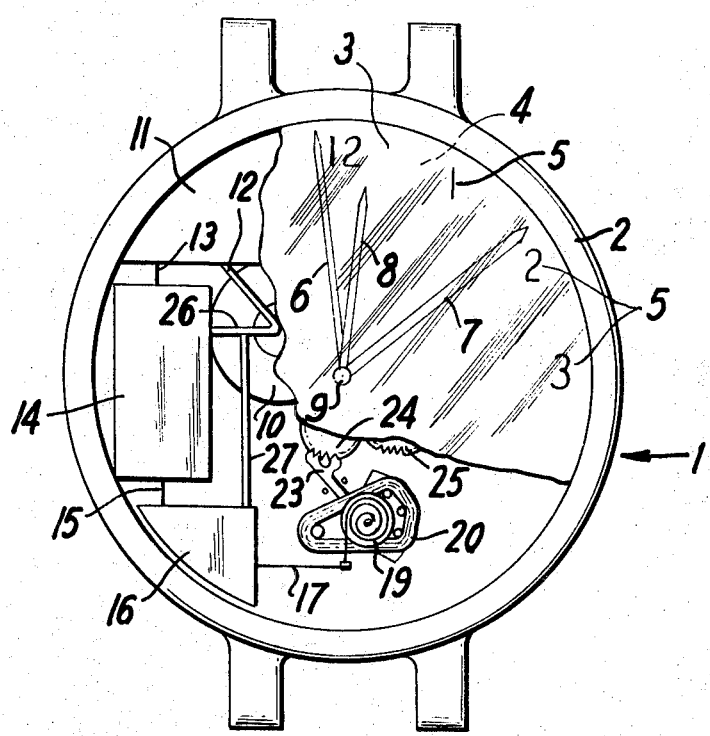

United States Patent

[11] 3,597,914

[72] Inventor Heinz Meitinger
 Pforzheim, Germany
[21] Appl. No. 857,165
[22] Filed Sept. 11, 1969
[45] Patented Aug. 10, 1971
[73] Assignee Timex Corporation
 Waterbury, Conn.

[54] WATCH BALANCE WHEEL
 8 Claims, 4 Drawing Figs.
[52] U.S. Cl. ............................................. 58/28 R,
  58/107
[51] Int. Cl. ................................................ G04c 3/04
[50] Field of Search ................................ 58/23, 28,
  107, 28 A

[56] References Cited
UNITED STATES PATENTS

| 3,512,351 | 5/1970 | Shelley et al. | 58/23 A |
| 2,953,896 | 9/1960 | Van Horn et al. | 58/28 |
| 3,492,806 | 2/1970 | Walton | 58/23 |

Primary Examiner—Richard B. Wilkinson
Assistant Examiner—Edith C. Simmons
Attorney—Richard A. Joel, Esq.

ABSTRACT: An electric-powered watch includes a balance wheel assembly which drives time display means. The balance wheel assembly includes a pivoted balance wheel staff, a central member fixed to the staff, and a balance wheel rim consisting only of a bundle of wires which are adhered together and self-supporting. The wires form a coil which cooperates with one or more magnetic fields to impulse the balance wheel assembly.

Patented Aug. 10, 1971  3,597,914

INVENTOR.
HEINZ MEITINGER
BY
Davis, Hoxie, Faithfull & Hapgood
ATTORNEYS

WATCH BALANCE WHEEL

DESCRIPTION

The present invention relates to horology and more particularly to the balance wheel assembly of an electric powered watch.

Various types of electronic watches have been suggested. For example, watches are being produced in which a battery, within the watch case, is connected to a circuit using transistors. The circuit is connected to two hairsprings which transmit electrical pulses to a coil carried by a balance wheel. The coil moves through a number of magnetic fields created by fixed magnets. It has also been suggested that higher timekeeping accuracy could be obtained by using a piezoelectric crystal oscillator as the time base of the watch. The crystal oscillator would synchronize a balance wheel type of motor which would drive the time display hands. Both of these types of watches may be called moving coil watches, as the coil is carried by the balance wheel.

In both of these types of watches, it is desirable that the balance wheel be sturdy, inexpensive, small in size, and that it does not create eddy currents. The mounting of a coil on a metal balance wheel gives rise to eddy currents as the metal of the balance wheel moves through the magnetic fields. Such eddy currents are a waste of power.

It is the objective of the present invention to provide a moving coil balance wheel assembly which is sturdy, low in cost, has few parts, and which does not create undesirable eddy currents.

It is the further objective of the present invention to provide a moving coil type of balance wheel which is small in size, so that it may fit in a ladies watch, and yet which may be exactly balanced (poised) by conventional methods.

Figure 2:
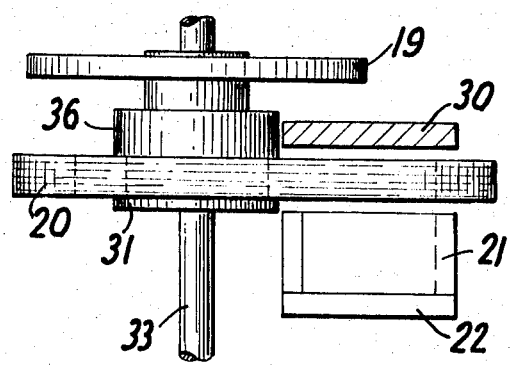
Figure 4:
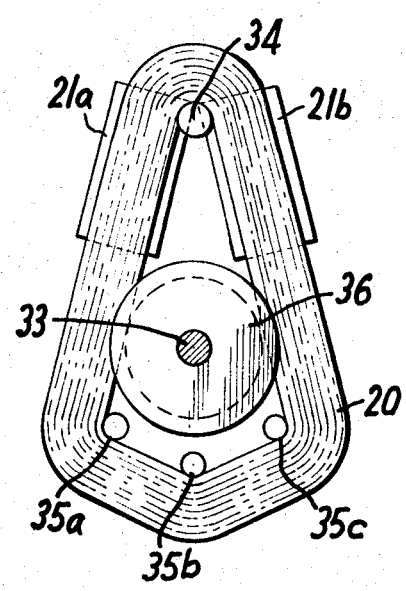
Figure 3:
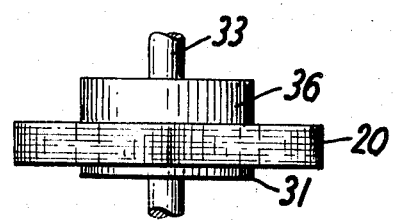

Other objectives of the present invention will be apparent from the following detailed description of the inventor's best mode of practicing the invention, the description being taken in conjunction with the accompanying drawings. In the drawings:

FIG. 1 is a top plan view, partly cut away, of the watch of the present invention;
FIG. 2 is a side plan view of the balance wheel assembly;
FIG. 3 is a front plan view of the coil; and
FIG. 4 is a top plan view of the coil.

In FIG. 1 the horological device of the present invention is shown as a wristwatch, although it is applicable to other types of horological instruments.

The wristwatch includes a case 1 having a bezel portion 2. A crystal 3 covers a dial 4 having, on its face, numbers 5 or other indicia of time. The time is indicated, as in conventional watches, by a seconds hand 6, a minutes hand 7, and an hours hand 8, which rotate from a common center 9. The power to operate the watch is derived from the small battery cell 10 which is internal to the watchcase 1. Alternatively, a solar cell or other electrical power source may be used.

The battery cell 10 is connected to a high frequency time base 11 by means of line 12. Preferably the time base 11 is a high frequency piezoelectric oscillator. The high output frequency of the time base 11, by means of line 13, is provided to the dividing circuit 14, which counts down its high frequency. The output of the dividing circuit 14, by line 15, is connected to a drive circuit 16. The output of the drive circuit, by line 17, is connected to the outer end of hairspring 19. The inner end of the hairspring is electrically connected to one end of the coil 20. The opposite end of the coil 20 is connected to a second hairspring (not shown), or other connection means, which is connected to the frame plate, the electrical ground. The battery 10 is used, as shown by line 26, to power the dividing circuit and, by line 27, to power the drive circuit. A suitable drive circuit is shown in Zemla's U.S. Pat. No. 3,046,460.

The coil 20, when pulsed by the drive circuit 16, cooperates with the magnetic piece 21 fastened to the lower shunt 22. A fork 23, pivotally fastened on the frame plate, indexes a rotatable index wheel 24. The index wheel 24, by means of a pinion (not shown), rotates a gear 25 which, in turn, is connected to the other gears of the gear train of the watch. The gear train of the watch rotates the previously mentioned hands 6, 7 and 8.

The term "time display," as used herein, includes rotatable hands as shown in FIG. 1, electro-optical display means such as a series of bulbs arranged on the dial of the watch, and other types of time indicating mechanisms.

In an alternative embodiment, the circuit 16 is a regenerative feedback astable multivibrator. Preferably, it is a relaxation oscillator utilizing a complementary pair of transistors.

The operation of this type of circuit is explained in the above-mentioned Zemla U.S. Pat. No. 3,046,460. The circuit and balance wheel form a complete oscillatory mechanism which need not be synchronized. In other words, the time base 11 and dividing circuit 14 need not be used and may be omitted from the watch.

The motor unit of the watch is shown in greater detail in FIG. 2. The coil 20 is wound about and attached to a disc unit consisting of a bottom stabilization disc 31 and a poising disc 36. The top and bottom discs may be a unitary member. The top disc 36 is used for final poising, that is, it is drilled or cut into to attain the final balance of the balance wheel assembly. The shape of the coil, which preferably is about a sector of a disc with rounded corners, is selected to initially poise the balance wheel. The discs 31 and 36, with their attached coil 20, are fixed to the balance wheel staff 33. The coil passes between axially poled magnets 21a and 21b, of opposite polarity, and an upper shunt 30. The magnets 21a and 21b are fixed on a lower shunt 22 which is attached to the frame plate. The coil is electrically connected to hairspring 19 and a second hairspring (not shown), although other connecting means may be used. The second hairspring may use the lower disc as its hub.

As shown in FIG. 4, the coil is wound using a front positioning pin 34 and rear positioning pins 35a, 35b and 35c, which are parts of a removable winding tool. The coil, of fine wire, is wound around the pins 34, 35a, 35b and 35c and also around the disc 31. Preferably the coil is directly wound on the disc. The coil may be wound using conventional coil-winding machinery. The coil is preferably self-supporting, that is, its windings have an adhesive material which joins the windings together. For example, the wire may be coated with a heat-activated resin and the coil, after winding but before the pins are moved, placed in an oven to melt the resin coating on the wires and form the coil into a unitary mass.

After the coil is wound and formed, the coil is lifted from the pins 34, 35a, 35b and 35c. It will retain its shape and form.

The balance wheel assembly is then poised. The dispoising caused by the tolerances of the positioning pins may be low, about 0.0008 inch, so that the poising may be accomplished by a removal of material from the top poising disc.

I claim:

1. A balance wheel assembly for an electric-powered watch, the assembly including a balance wheel staff, a central poising member adapted to poise fixed to the staff, and a balance wheel rim extending completely around and fixed to the central member, said rim consisting of only a bundle of fine windings and means to adhere the windings together.

2. A balance wheel assembly as in claim 1 wherein the central member consists of a stabilization disc and a poising disc and the coil is fixed in a slot formed between the two discs.

3. A balance wheel assembly as in claim 1 wherein the shape of the coil, viewed from a top plan view, is approximately a sector of a disc, the sector having rounded corners.

4. An electronic watch comprising a frame plate, a source of electric current, a piezoelectric crystal oscillator connected to said current source, a frequency-dividing circuit connected to said oscillator, a drive circuit coupled to the output of said dividing circuit, a time display means, and a balance wheel assembly means for creating a magnetic field cooperating with and connected with said drive circuit to drive said time display means, said balance wheel assembly further including a balance wheel staff pivoted in the frame plate, a central poising member fixed to the balance wheel staff, and a balance wheel rim extending completely around and fixed to the poising member, said consisting only of a bundle of fine windings.

5. An electronic watch as in claim 4 wherein the means to create a magnetic field consists of two axially poled magnets of opposite polarity.

6. A balance wheel assembly as in claim 4 wherein the central member consists of a stabilization disc and a poising disc and the coil is fixed in a slot formed between the two discs.

7. A balance wheel assembly as in claim 4 wherein the shape of the coil, viewed from a top plan view, is approximately a sector of a disc, the sector having rounded corners, the shape being such as to balance the coil about the center staff and to avoid a high inductive EMF at 180° from the zero line.

8. A balance wheel assembly as in claim 4 shaped in such a manner that except for the wire of the coil no other metallic parts move through the airgap of the driving magnet.